(12) United States Patent
Ryu et al.

(10) Patent No.: US 10,307,768 B2
(45) Date of Patent: Jun. 4, 2019

(54) CHEMICAL LOOPING COMBUSTOR USING MAGNETIC OXYGEN CARRIER PARTICLES AND LOOP SEAL EQUIPPED WITH MAGNETIC SEPARATOR

(71) Applicant: KOREA INSTITUTE OF ENERGY RESEARCH, Daejeon (KR)

(72) Inventors: Ho-Jung Ryu, Daejeon (KR); Keun-hee Han, Daejeon (KR); Gyoung-tae Jin, Daejeon (KR); Chang-keun Yi, Daejeon (KR); Do-won Shun, Daejeon (KR); Jae-hyeon Park, Daejeon (KR); Dal-hee Bae, Sejong-si (KR); Sung-ho Jo, Daejeon (KR); Seung-yong Lee, Daejeon (KR); Young Cheol Park, Daejeon (KR); Jong-ho Moon, Daejeon (KR); Do Yeon Lee, Seoul (KR); Hyo Jin Lee, Daejeon (KR); Dong-ho Lee, Daejeon (KR); Jeom In Baek, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 177 days.

(21) Appl. No.: 15/498,766

(22) Filed: Apr. 27, 2017

(65) Prior Publication Data

US 2018/0283682 A1  Oct. 4, 2018

(30) Foreign Application Priority Data

Apr. 3, 2017 (KR) .................. 10-2017-0043054

(51) Int. Cl.
  *F23C 10/00* (2006.01)
  *B03C 1/22* (2006.01)
  (Continued)

(52) U.S. Cl.
  CPC .................. *B03C 1/22* (2013.01); *B03C 1/01* (2013.01); *B03C 1/30* (2013.01); *F23C 10/005* (2013.01);
  (Continued)

(58) Field of Classification Search
  CPC ...................................................... F23C 10/002
  (Continued)

(56) References Cited

U.S. PATENT DOCUMENTS 4,330,399 A * 5/1982 Dijkhuis ............... B03C 1/0335
  209/11
2001/0048902 A1* 12/2001 Hertzler ................. B01D 53/68
  422/177

(Continued)

FOREIGN PATENT DOCUMENTS

CN    102878552 A    1/2013
JP    2009-270814 A    11/2009
  (Continued)

*Primary Examiner* — Avinash A Savani
(74) *Attorney, Agent, or Firm* — Akerman LLP

(57) ABSTRACT

The present invention relates to a CLC and operation method thereof equipped with a loop seal separator using magnetic oxygen carrier particles and a magnetic separator. And more particularly, the present invention relates to a loop seal separator using magnetic oxygen carrier particles and a magnetic separator, wherein the loop seal separator comprises a duct into which the ash and magnetic oxygen carrier particles, discharged from a reducer, flow; a magnetic separator to separate the ash from the magnetic oxygen carrier particles, flowing into the duct, by magnetic material; an ash discharge pipe to discharge the ash, separated by the magnetic separator; and an oxygen-carrier-particle discharge pipe to encourage the magnetic oxygen carrier particles, separated by the magnetic separator, to flow into an oxidizer.

11 Claims, 7 Drawing Sheets

(51) Int. Cl.
*B03C 1/01* (2006.01)
*B03C 1/30* (2006.01)
*F23C 10/10* (2006.01)
*F23C 10/26* (2006.01)

(52) U.S. Cl.
CPC .............. *F23C 10/10* (2013.01); *F23C 10/26* (2013.01); *B03C 2201/20* (2013.01); *F23C 2900/99008* (2013.01); *F23J 2900/15023* (2013.01); *F23K 2201/30* (2013.01); *Y02E 20/346* (2013.01)

(58) Field of Classification Search
USPC .................................................. 431/3; 95/28
See application file for complete search history.

(56) References Cited

U.S. PATENT DOCUMENTS

2005/0175533 A1* 8/2005 Thomas .................. C01B 3/063
423/657
2006/0140832 A1* 6/2006 Luomaharju ........... F23C 10/10
423/215.5
2007/0095203 A1* 5/2007 Paris ...................... B01D 53/64
95/28

FOREIGN PATENT DOCUMENTS

KR 10-1458872 11/2014
KR 10-1594799 2/2016

* cited by examiner

| Composition [%] | | | | | | | | | |
|---|---|---|---|---|---|---|---|---|---|
| CaO | SiO$_2$ | Al$_2$O$_2$ | MgO | Fe$_2$O$_3$ | MnO | Cr$_2$O$_3$ | S | TiO$_2$ | P$_2$O$_5$ |
| 2.28 | 31.70 | 4.22 | 1.71 | 45.60 | 0.11 | 0.05 | 0.54 | 0.38 | 0.42 |

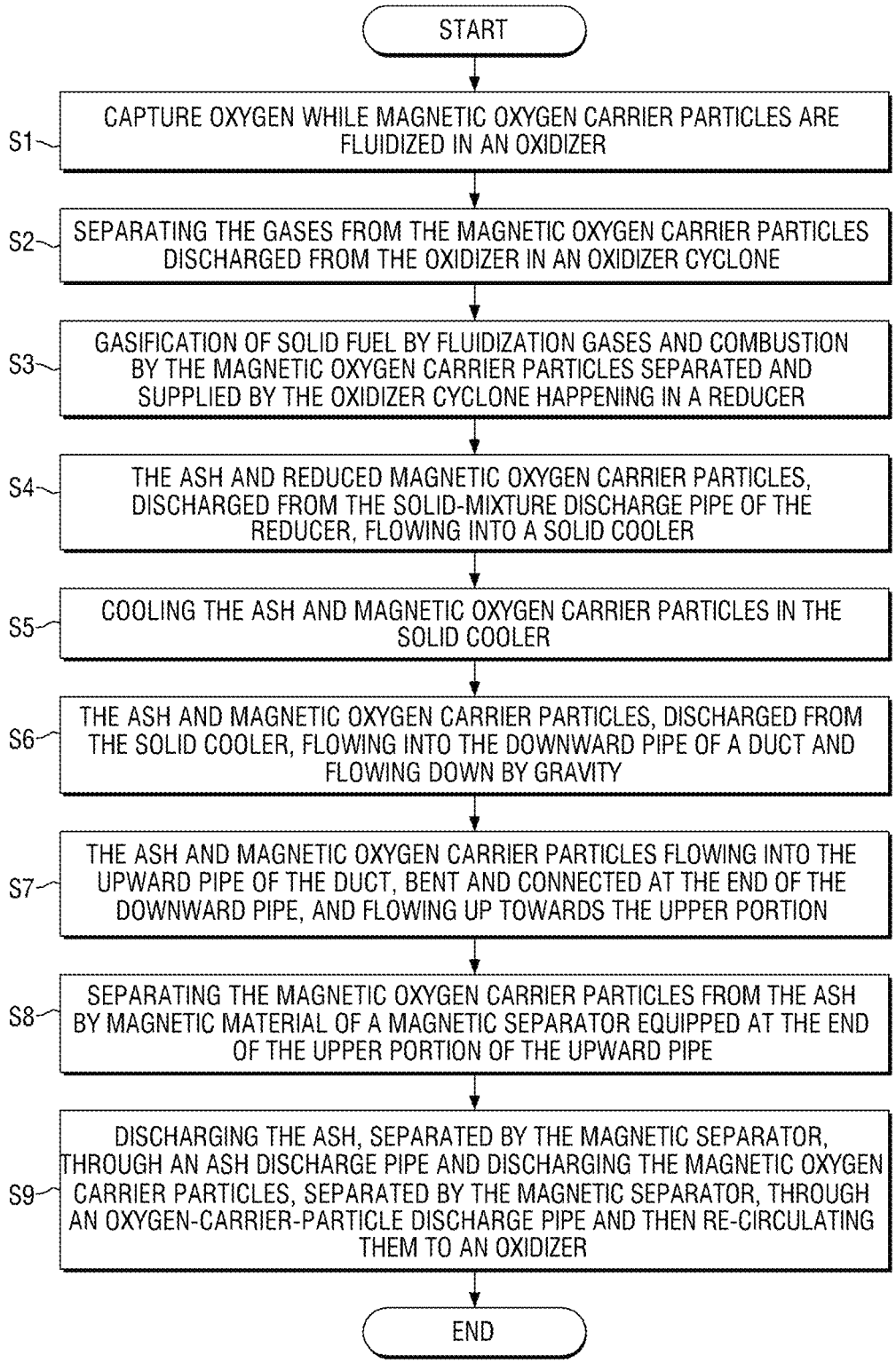

CHEMICAL LOOPING COMBUSTOR USING MAGNETIC OXYGEN CARRIER PARTICLES AND LOOP SEAL EQUIPPED WITH MAGNETIC SEPARATOR

CROSS-REFERENCE TO RELATED APPLICATIONS

The present application claims priority to Korean Patent Application No. 10-2017-0043054, filed Apr. 3, 2017, the entirety of which is incorporated herein by reference.

BACKGROUND OF THE INVENTION

Field of the Invention

The present invention relates to a chemical looping combustor (CLC) and operation method thereof equipped with a loop seal separator using magnetic oxygen carrier particles and a magnetic separator.

Background of the Related Art

Chemical looping combustion is a technological process, in which $CO_2$ can be inherently separated during the process without an additional $CO_2$ separation process, as well as a next-generation, high-efficiency, low-pollution process in which less thermal $NO_x$ is produced, and high efficiency in electricity generation is ensured. Recently, research on solid fuel chemical looping combustion, in which $CO_2$ can be inherently separated during the process without an additional $CO_2$ separation process while solid fuel is directly burnt instead of expensive gaseous fuel, has been developing.

FIG. 1 shows the basic concept of the solid fuel chemical looping combustion process. In an oxidizer, as in the following reaction formula 1, oxygen carrier particles (M), in the form of metal, react with oxygen in the air, produce metal oxide (MO, hereinafter oxygen binding particle) and are transported to a reducer. In the reducer, steam and/or $CO_2$ are supplied as a gas to fluidize solid fuel, and the solid fuel is gasified by such a fluidization gas.

   [Reaction Formula 1]

Then, coal, cokes, char, biomass and so on can be used as solid fuel; for example, coal in a reducer produces CO and $H_2$ in the reaction of carbon (C) with steam, as in the following reaction formula 2, or produces CO in the reaction of C with $CO_2$, as in the reaction formula 3. Additionally, as in the reaction formulas 4 and 5, the produced CO and $H_2$ react with the oxygen binding particles, transported from the oxidizer, to produce $CO_2$ or $H_2O$, and oxygen carrier particles, reduced in the form of metal, is re-circulated to the oxidizer.

   [Reaction Formula 2]

   [Reaction Formula 3]

   [Reaction Formula 4]

   [Reaction Formula 5]

Consequently, high concentrations of $CO_2$ can be separated inherently without an additional $CO_2$ separation process by condensing and removing $H_2O$ because the only gases produced from the reducer of a CLC are $CO_2$ and $H_2O$.

In the reducer of a solid fuel chemical looping combustor (SF-CLC), a gasification reaction by steam and a combustion reaction by oxygen carrier particles take place at the same time. In the oxidizer and reducer, the reactions are performed at high temperatures of 600 to 1200° C. In the reaction, while solid fuel such as coal, biomass and waste is being supplied continuously to the reducer, they react with oxygen carrier particles and then they are reduced. As a result, combustible components, including volatile matter and fixed carbon, react with the oxygen contained in oxygen carrier particles and are transformed into gases like $CO_2$, CO and $H_2O$ to come out of the reducer, but the ash contained in solid fuel is accumulated in the reducer.

This means, when solid fuel is used as fuel, the ash and oxygen carrier particles remaining in the reducer shall be removed regularly and continuously because it is hard to separate ash from oxygen carrier particles.

Therefore, in the case of an SF-CLC, cheap oxygen carrier particles (iron ore, ilmenite, oxide scale, bauxite, compound thereof, and so on) that are disposable along with ash is used, instead of oxygen carrier particles containing expensive metal components including Ni, Co, Fe, Cu, Mn, Ce and compound thereof, and so on.

However, when cheap oxygen carrier particles are disposed of along with ash, the cost of disposing of waste is incurred. In addition, even cheap oxygen carrier particles are not economically efficient because they shall be continuously made up for.

PRIOR ART DOCUMENTS

Patent Documents (Patent Document 0001) Japanese Patent Publication No. JP2009-270814

(Patent Document 0002) Korean Patent No. KR1594799

(Patent Document 0003) Chinese Patent Publication No. CN201210232754

(Patent Document 0004) Korean Patent No. KR1458872

SUMMARY OF THE INVENTION

The present invention is devised to solve the above mentioned conventional problems and, according to an embodiment of the present invention, the purpose of the present invention is to make a circulation operation possible without loss of oxygen carrier particles and to provide an SF-CLC applying a solid cooler for stable operations of a loop seal separator by using the methods in which an oxidation-reduction reaction is performed using magnetic oxygen carrier particles instead of traditional oxygen carrier particles, and magnetic oxygen carrier particles and non-magnetic ash are separated in a loop seal separator equipped with a magnetic separator, and the oxygen carrier particles are re-circulated to the CLC, and then, the ash is separated out and removed.

On the other hand, desirable technical subjects achieved by the present invention are not limited to the above mentioned ones, and other technical subjects, not mentioned herein, can be clearly understood by one of ordinary skill in the art to which the present invention pertains by reference to the following descriptions.

The first purpose of the present invention can be achieved by a loop seal separator using magnetic oxygen carrier particles and a magnetic separator, wherein the loop seal separator comprises a duct into which the ash and magnetic oxygen carrier particles discharged from a reducer flow; a magnetic separator to separate the ash from the mixture of ash and oxygen carrier particles, flowing into the duct, by using magnetic material; an ash discharge pipe to discharge the ash, separated by the magnetic separator; and an oxygen-carrier-particle discharge pipe to encourage the magnetic oxygen carrier particles, separated by the magnetic separator, to flow into an oxidizer.

And the duct comprises a downward pipe, wherein the length direction of the downward pipe is the vertical direction, and the ash and magnetic oxygen carrier particles, flowing in, flow down towards the lower portion of the downward pipe by gravity, and an upward pipe, wherein the length direction of the upward pipe is the vertical direction, and the upward pipe is bent at the end of the lower portion of the downward pipe to encourage the ash and magnetic oxygen carrier particles to flow up towards the upper portion of the upward pipe.

The present invention also comprises an fluidization-gas supplying device, equipped at the part where the upward pipe and the downward pipe are connected, to inject fluidization gases for cooling and fluidization.

In addition, the magnetic oxygen carrier particles are slag balls, wherein slag is manufactured in the form of a sphere by automizaton.

Further, the slag balls are magnetic in both oxidized and reduced states and they are copper slag balls containing $Fe_2O_3$.

Moreover, the magnetic separator is connected to the end of the upper portion of the upward pipe and comprises magnetic material in the form of a panel; a conveyor belt contacted by the magnetic oxygen carrier particles by magnetic forces of the magnetic material; a driving device to drive the conveyor belt; and a detaching device to remove the magnetic oxygen carrier particles, contacted to the conveyor belt, and to encourage the magnetic oxygen carrier particles to flow into an oxygen-carrier-particle discharge pipe.

The second purpose of the present invention can be achieved by a method of separating ash from magnetic oxygen carrier particles, wherein the method of separating ash from magnetic oxygen carrier particles comprises the steps of encouraging the ash and magnetic oxygen carrier particles, discharged from a reducer, to flow into the downward pipe of a duct and encouraging the ash and magnetic oxygen carrier particles to flow down by gravity; encouraging the ash and magnetic oxygen carrier particles to flow into the upward pipe, bent and connected at the end of the lower portion of the downward pipe and encouraging the ash and magnetic oxygen carrier particles to flow up; separating the ash from the magnetic oxygen carrier particles by the magnetic material of the magnetic separator, equipped at the end of the upper portion of the upward pipe; and discharging the ash, separated by the magnetic separator, through an ash discharge pipe and encouraging the magnetic oxygen carrier particles, separated by the magnetic separator, to flow into an oxidizer.

And the step in which ash and magnetic oxygen carrier particles are separated from each other is characterized in that the ash does not contact a conveyor belt in the upward pipe and is separated out through an ash discharge pipe, while the magnetic oxygen carrier particles contact the conveyor belt by magnetic forces of magnetic material, flow up towards the upper portion of an oxygen-carrier-particle discharge pipe and are removed by a detaching device and then, discharged through the oxygen-carrier-particle discharge pipe.

The third purpose of the present invention can be achieved by an SF-CLC, wherein the SF-CLC comprises an oxidizer to capture oxygen while magnetic oxygen carrier particles are fluidized; an oxidizer cyclone to separate the gases from the magnetic oxygen carrier particles, discharged from the oxidizer; a reducer to bring about gasification of solid fuel by reduction fluidization gases and combustion by the magnetic oxygen carrier particles, separated and supplied by the oxidizer cyclone, and to discharge the ash and reduced magnetic oxygen carrier particles; and a loop seal separator, according to the above mentioned first purpose, to separate the magnetic oxygen carrier particles from the ash, supplied by the reducer, and to encourage only the magnetic oxygen carrier particles to flow into the oxidizer.

And the present invention further comprises a solid cooler, equipped between the oxidizer and the loop seal separator, to cool the magnetic oxygen carrier particles and ash, discharged through the solid-mixture discharge pipe of the reducer, and then to encourage the magnetic oxygen carrier particles and ash to flow into the duct of the loop seal separator.

Additionally, the solid cooler takes the form of a fluidized bed and comprises a cooling-gas supplying device, equipped at the lower portion of the solid cooler, to supply cooling gases for cooling and fluidization, a solid-mixture inflow part connected to the solid-mixture discharge pipe, a solid-cooler discharge pipe, equipped on one side of the upper portion of the solid cooler, and a discharge part connected to the duct of the loop seal separator.

Moreover, the present invention further comprises a reducer cyclone to separate the gases from the mixture of ash and oxygen carrier particles, discharged from the solid cooler, and to return the ash and oxygen carrier particles to the reducer.

Also, the present invention further comprises a solid-cooler cyclone to separate the gases from the mixture of ash and oxygen carrier particles, discharged from the solid cooler, and to return the ash and oxygen carrier particles to the solid cooler.

The fourth purpose of the present invention can be achieved by the method of operating an SF-CLC, wherein the method of operating an SF-CLC includes the steps of capturing oxygen while magnetic oxygen carrier particles are fluidized in an oxidizer; separating the gases from the magnetic oxygen carrier particles, discharged from the oxidizer, in an oxidizer cyclone; bringing about gasification of solid fuel by reduction fluidization gases and combustion by the magnetic oxygen carrier particles, separated and supplied by the oxidizer cyclone, in a Reducer; discharging the ash and reduced magnetic oxygen carrier particles through the solid-mixture discharge pipe of the reducer and encouraging the ash and reduced magnetic oxygen carrier particles to flow into a solid cooler; cooling the magnetic oxygen carrier particles and ash in the solid cooler; and encouraging the magnetic oxygen carrier particles and ash, cooled in the solid cooler, to flow into a loop seal separator, separating the magnetic oxygen carrier particles from the ash by magnetic material, then discharging the ash through an ash discharge pipe and recirculating the magnetic oxygen carrier particles to the oxidizer through an oxygen-carrier-particle discharge pipe.

And the step of recirculating comprises the steps of encouraging the ash and magnetic oxygen carrier particles, discharged from the solid cooler, to flow into a downward pipe of the duct and then encouraging them to flow down by gravity; encouraging the ash and magnetic oxygen carrier particles to flow into an upward pipe, bent and connected at the end of the lower portion of the downward pipe, and then encouraging them to flow up towards the upper portion of the upward pipe; separating the ash from the magnetic oxygen carrier particles by magnetic material of a magnetic separator, equipped at the end of the upper portion of the upward pipe; and discharging the ash, separated by the magnetic separator, through an ash discharge pipe and then encouraging the magnetic oxygen carrier particles, separated by the magnetic separator to flow into an oxidizer.

According to an embodiment of the present invention, a circulation operation without loss of oxygen carrier particles, and stable operations of a loop seal separator are possible by applying a solid cooler to an SF-CLC, using the methods in which an oxidation-reduction reaction is performed with magnetic oxygen carrier particles instead of traditional oxygen carrier particles, and the magnetic oxygen carrier particles and non-magnetic ash are separated in a loop seal separator, equipped with a magnetic separator, and the oxygen carrier particles are re-circulated to the CLC, and the ash is separated out and removed.

On the other hand, effects obtained through the present invention are not limited to the above mentioned ones and other effects, not mentioned herein, can be clearly understood by one of ordinary skill in the art to which the present invention pertains by reference to the following descriptions.

BRIEF DESCRIPTION OF THE DRAWINGS

Since the following drawings attached in the present application illustrate a preferred embodiment of the present invention and are helpful for better understanding of technical ideas of the present invention, along with the detailed description of the present invention, interpretation of the present invention shall not be limited only to the descriptions of the drawings.

FIG. 10 is a flow chart showing the method of operating a CLC according to an embodiment of the present invention.

DETAILED DESCRIPTION OF THE PREFERRED EMBODIMENT

Figures 1, 2:
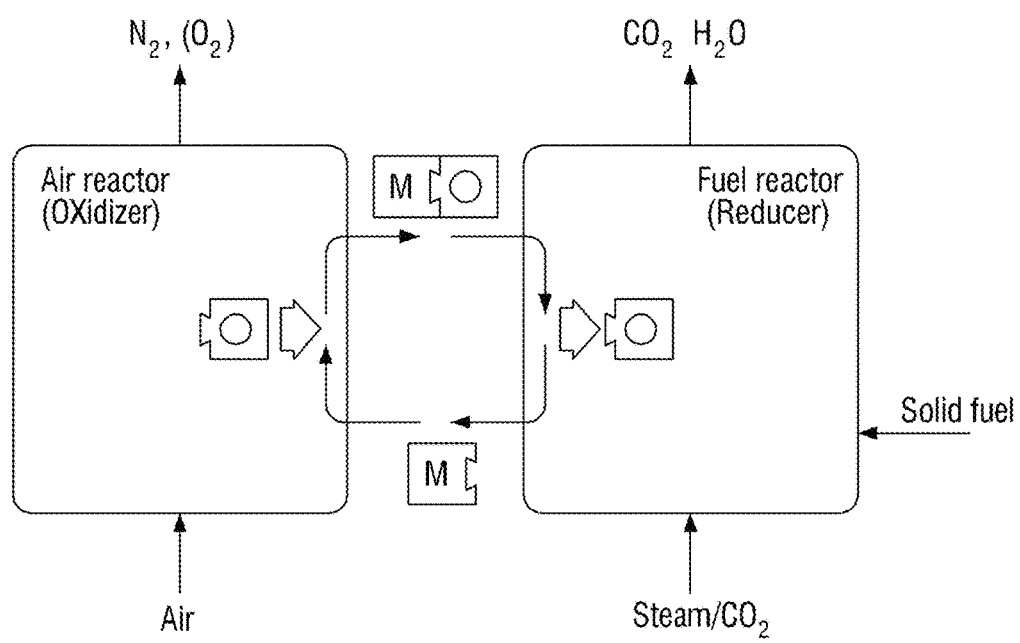
FIG. 1 is a conceptual diagram describing the SF-CLC technology.
FIG. 2 is a table showing the composition of copper slag balls according to an embodiment of the present invention.

The above mentioned purposes, other purposes, features and advantages can be easily understood with the following preferred embodiments of the present invention related to the attached drawings. However, the present invention is not limited to the embodiments described herein and can be embodied in different forms. Instead, the embodiments described herein are provided to make the descriptions here thorough and perfect and to convey the idea of the present invention well enough to one of ordinary skill in the art.

In the present application, when it is mentioned that a component is deposited on another component, it means that the component can be directly formed on another component, or a third component can intervene between them. Also, in the drawings, the width of components is exaggerated for effective explanations.

The embodiments described in the present application can be explained by reference to sectional views and/or plan views as ideal illustrations of the present invention. In the drawings, the width of films and regions is exaggerated for effective explanations of technical subjects. Accordingly, the form of illustrations can be changed according to manufacturing technologies and/or allowable errors, and so on. This means that the embodiments of the present invention are not limited to a certain form descried herein and includes possible changes in its form according to manufacturing processes. For example, regions showing right angles can be rounded and can take a form with designated curvature. As a result, the regions illustrated in the drawings have their own properties, and the shape of the regions is not to limit the scope of the invention, but to illustrate a certain form of the regions of elements. In various embodiments of the present invention, the terms 'first', 'second', etc are used to describe various components but those components shall not be limited by such terms. Those terms are just used to distinguish a component from the other components. The embodiments explained and illustrated herein include their complementary embodiments.

Terms in the present application are used to explain the embodiments but not to limit the present invention. In the present application, unless otherwise stated, the use of a singular noun includes the plural. The term "comprises" and/or "comprising" in the present application will be understood to imply the inclusion of stated components but not the exclusion of any other components.

In the descriptions of the following specific embodiments, a variety of specific subjects are written to explain the invention in more detail and to be helpful for better understanding of the invention. However, any reader with enough knowledge of the art to understand the present invention can understand that the present invention can be used without such a variety of specific subjects. In advance, it is mentioned that in some cases, what is commonly known but not significantly related to the invention is not described in the descriptions of the present invention to prevent confusion caused for no special reason.

In the following description, the composition and function of a loop seal separator using magnetic oxygen carrier particles (1) and a magnetic separator (20) will be explained.

In a loop seal separator (10) using magnetic oxygen carrier particles (1) and a magnetic separator (20) according to an embodiment of the present invention, instead of traditional oxygen carrier particles, magnetic oxygen carrier particles (1) are applied. In the following description, the function and property of magnetic oxygen carrier particles (1) according to an embodiment of the present invention are first explained.

As a detailed embodiment of the present invention, magnetic oxygen carrier particles (1) consist of copper slag balls, an automized slag ball where slag, remaining in an electric furnace during the process for manufacturing steel, is manufactured in the form of a sphere by automization.

FIG. 2 is a table showing the composition of copper slag balls according to an embodiment of the present invention. As shown in FIG. 2, since the copper slag balls contain 45.6% of $Fe_2O_3$, they bring about an oxidation-reduction reaction in the oxidizer (30) and the reducer (50) of a CLC (100).

Figure 3A:
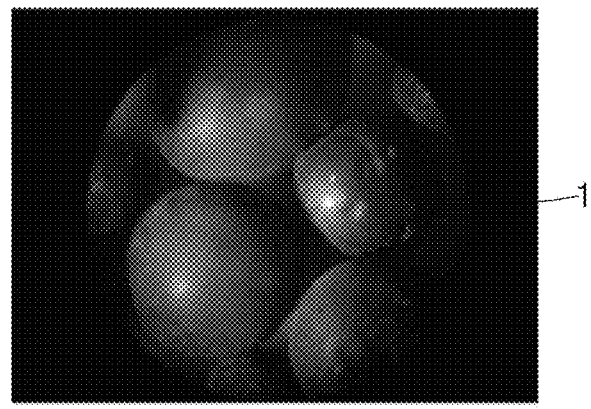
FIGS. 3A and 3B are photomicrographs showing copper slag balls according to an embodiment of the present invention.
Figure 3B:
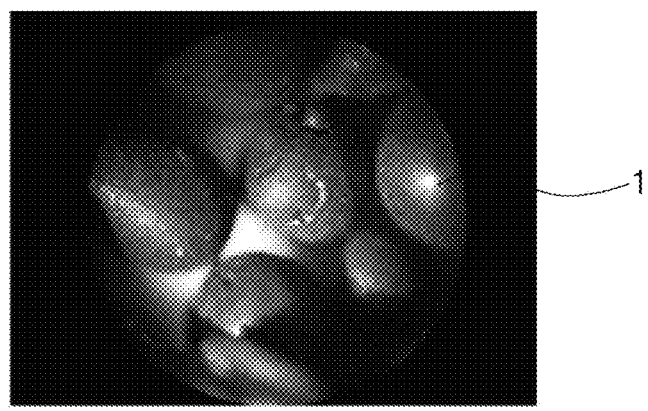

FIGS. 3A and 3B are photomicrographs showing copper slag balls according to an embodiment of the present invention. As shown in FIGS. 3A and 3B, as a result of checking the shape of the copper slag balls, it can be seen that the copper slag balls take the shape of a sphere.

Figure 4:
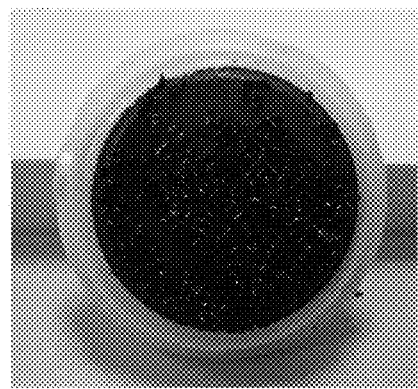
FIG. 4 is a picture showing oxidized copper slag balls attached to a magnet according to an embodiment of the present invention.

Also, a magnet is used to see whether the copper slag balls are attached to the magnet or not. FIG. 4 is a picture showing oxidized copper slag balls according to an embodiment of the present invention.

As shown in FIG. 4, it can be seen that the copper slag balls are attached to a magnet installed at a slant. According to this experiment, it turns out that oxidized copper slag balls are magnetic.

Figure 5:
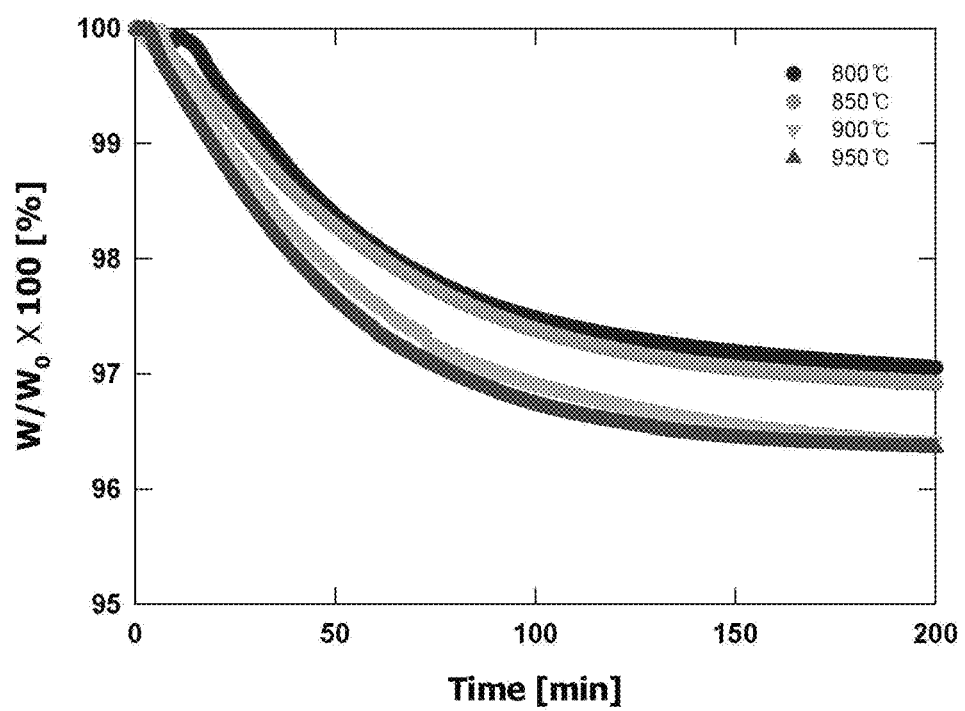
FIG. 5 is a graph showing the results of the measuring of weight changes, in isothermal conditions such as 800° C., 850° C., 900° C. and 950° C., in Thermogravimetric Analyzer (TGA), by using $CH_4$ 5% ($CO_2$ balance) as a reactive gas to check the reactivity of copper slag balls with fuel according to an embodiment of the present invention.

FIG. 5 is a graph showing the results of the measuring of weight changes, in isothermal conditions such as 800° C., 850° C., 900° C. and 950° C., in TGA, by using $CH_4$ 5% ($CO_2$ balance) as a reactive gas to check the reactivity of copper slag balls with fuel according to an embodiment of the present invention.

In FIG. 5, $W_O$ means an initial weight, and W means weight measured according to time. As shown in FIG. 5, the weight of particles tends to be reduced as time goes by. It can be understood that the particles give out oxygen while reacting with $CH_4$ and experience weight loss. Also, it can be understood that the higher reaction temperatures go up, the more weight loss the particles experience. This indicates that the particles give out and supply more oxygen at higher temperatures.

Figure 6:
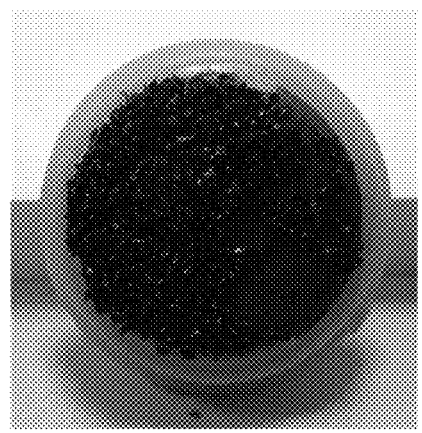
FIG. 6 is a picture showing reduced copper slag balls attached to a magnet according to an embodiment of the present invention.

FIG. 6 is a picture showing reduced copper slag balls, according to an embodiment of the present invention. As shown in FIG. 6, a magnet is used to see whether the copper slag balls, after their reaction with fuel, in the reduced state where they gives out all oxygen, are magnetic or not. As shown in FIG. 6, it can be seen that the reduced copper slag are attached to a magnet installed at a slant. This experiment indicates that the reduced copper slag balls are magnetic.

In the following descriptions, the composition of a loop seal separator (10) using magnetic oxygen carrier particles (1) that are capable of giving oxygen by said reaction with fuel and have magnetic forces in both oxidized and reduced states.

Figure 7:
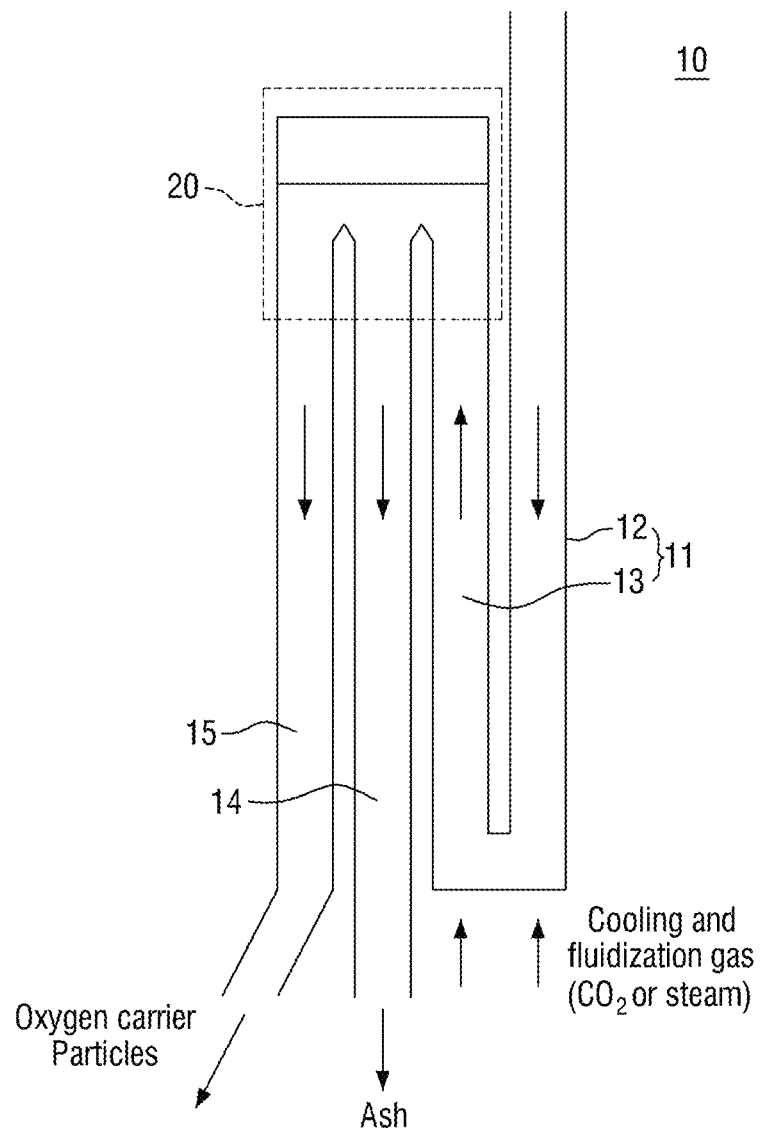
FIG. 7 is a diagram of a loop seal separator using magnetic oxygen carrier particles and a magnetic separator.
Figure 8:
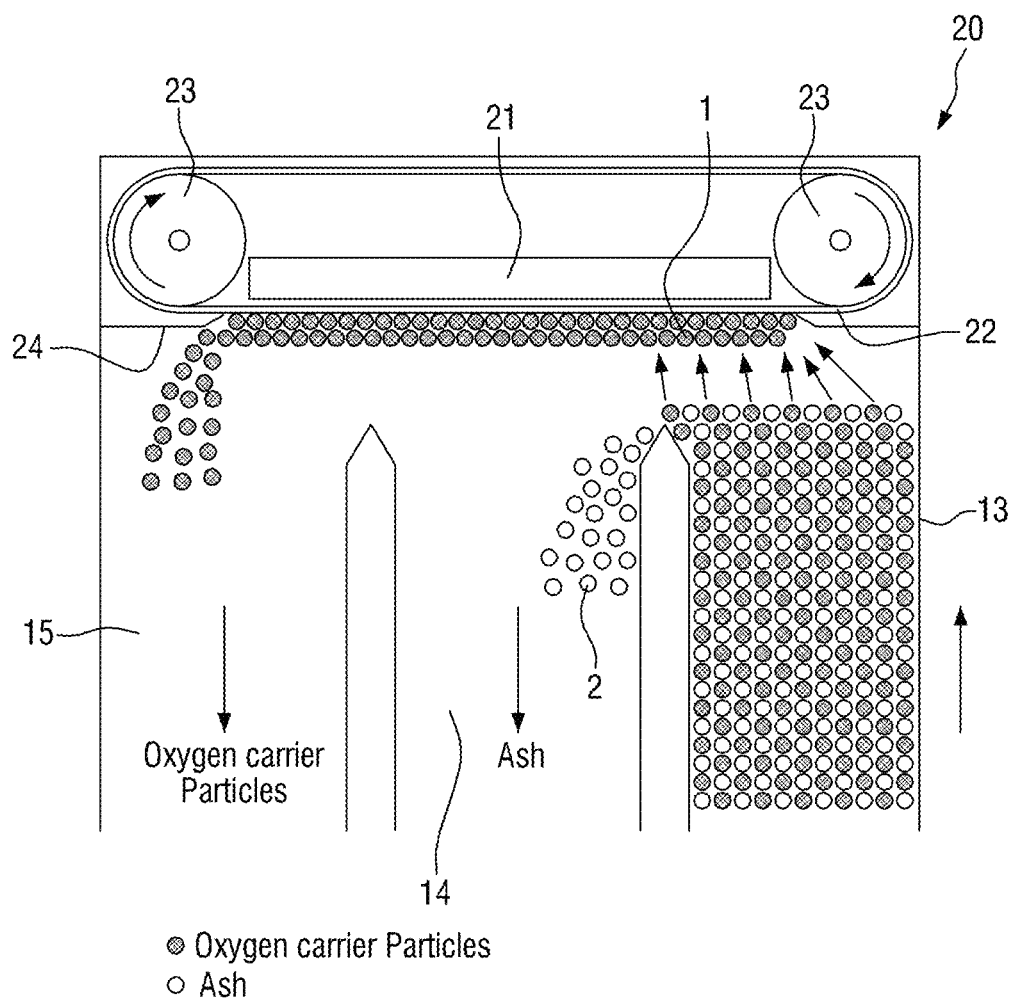
FIG. 8 is an enlarged diagram of Part A of FIG. 7.

First, FIG. 7 is a diagram showing the composition of a loop seal separator using magnetic oxygen carrier particles (1) and a magnetic separator (2). And FIG. 8 is an enlarged diagram of Part A of FIG. 7.

As shown in FIG. 7, a loop seal separator (10) using magnetic oxygen carrier particles (1) and a magnetic separator (20), as a whole, comprises a duct (11), a magnetic separator (20), an ash discharge pipe (14), an oxygen-carrier-particle discharge pipe, and so on.

First, the ash (2), discharged from a reducer (50), and the magnetic oxygen carrier particles (1), reduced in the reducer (50) by giving out oxygen, pass through a solid cooler (70) and flow into a duct (11).

As shown in FIG. 7, the duct (11) according to an embodiment of the present invention comprises a downward pipe (12) wherein its length direction is the vertical one and the ash (2) and magnetic oxygen carrier particles (1), flowing into the downward pipe, are encouraged to flow down towards the lower portion of the downward pipe by gravity, and an upward pipe wherein its length direction is the vertical one, the upward pipe (13) is bent and connected at the end of the lower portion of the downward pipe (12), the ash (2) and magnetic oxygen carrier particles (1) flowing into the upward pipe are encouraged to flow up towards the upper portion of the upward pipe.

Also, a fluidization-gas supplying device is equipped at the part where the downward pipe (12) and upward pipe (13) are connected, wherein the fluidization-gas supplying device supplies cooling and fluidization gases such as CO2 and/or steam and fluidizes the ash (2) and magnetic oxygen carrier particles (1) so that they have the same properties as fluids, and the fluidized solid mixture (magnetic oxygen carrier particles (1)) and ash (2)) are encouraged to flow up through the upward pipe (13).

In addition, as shown in FIGS. 7 and 8, a magnetic separator (20) is quipped at the end of the upper portion of the upward pipe (13), wherein the magnetic separator (20) separates the ash (2) and magnetic oxygen carrier particles (1) by magnetic material (21).

The magnetic separator (20) according to an embodiment of the present invention is connected to the end of the upper part of the upward pipe (13) and comprises magnetic material (21) in the form of a panel, a conveyor belt (22) contacted by the oxygen carrier particles (1) which become magnetic by magnetic forces of magnetic material (21), a driving device to drive the conveyor belt (22), a detaching device (24) to remove the magnetic oxygen carrier particles (1) contacting the conveyor belt (22) and to encourage them to flow into an oxygen-carrier-particle discharge pipe (15).

In the method of separating oxygen carrier particles (1) and ash (2) by a loop seal separator (10) using magnetic oxygen carrier particles (1) and a magnetic separator (20) according to an embodiment of the present invention, the ash (2) and magnetic oxygen carrier particles (1), discharged from a reducer (50), flow into the downward pipe (12) of a duct (11) and flow down by gravity and they are fluidized by fluidization gases and then flow up through the upward pipe (13).

And the ash (2) and magnetic oxygen carrier particles (1) are separated from each other by magnetic material (21) of the magnetic separator (22), equipped at the end of the upper portion of the upward pipe (13). That is to say, the ash (2) does not contact the conveyor belt in the upward pipe (13) and it is separated and discharged through an ash discharge pipe (14), while the magnetic oxygen carrier particles (1) contact the conveyor belt by magnetic forces of the magnetic material (21), flow up towards the upper portion of an oxygen-carrier-particle discharge pipe (15) and are removed by a detaching device and separated and discharged through an oxygen-carrier-particle discharge pipe and then flow into an oxidizer (30) to recirculate.

Figure 9:
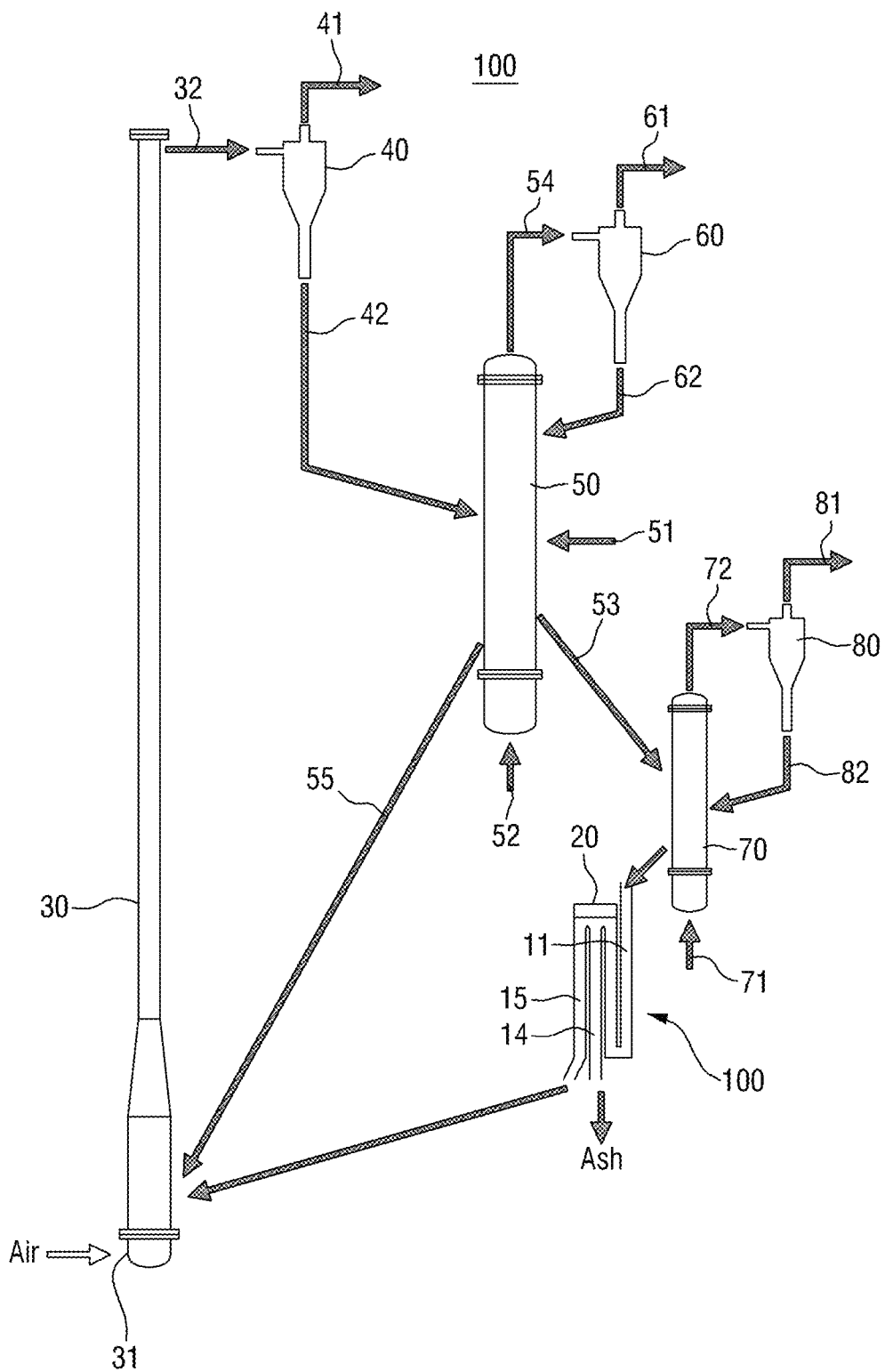
FIG. 9 is a diagram of a CLC equipped with a solid cooler and a loop seal separator using magnetic oxygen carrier and a magnetic separator.

In the following descriptions, the composition and operation method of a loop seal separator (10), using magnetic oxygen carrier particles (1) and a magnetic separator (20), and a CLC (100), equipped with a solid cooler, (70) according to an embodiment of the present invention, will be explained. First, FIG. 9 is a diagram of a loop seal separator (10) using magnetic oxygen carrier particles (1) and a magnetic separator (20), and a CLC (100), equipped with a solid cooler (70). And FIG. 10 shows a flow chart showing the method of operating a CLC according to an embodiment of the present invention.

An SF-CLC (100) according to an embodiment of the present invention, as shown in FIG. 9, can be configure to comprise an oxidizer (30), an oxidizer cyclone (40), a reducer (50), a reducer cyclone (60), a solid cooler (70), a solid-cooler cyclone (80) and a loop seal separator (10).

The oxidizer (30) is equipped with a supply pipe (31) to supply fluidization gases and with an oxidizer discharge pipe (32), and captures oxygen while magnetic oxygen carrier particles (1) are fluidized. And the magnetic oxygen carrier particles capturing oxygen (1) (in an oxidized state) are discharged along with gases through an oxidizer discharge pipe (32) and then flow into an oxidizer cyclone (40).

The oxidizer cyclone (40) discharges the gases, discharged from the oxidizer (30), through the gas discharge pipe (41) of the oxidizer cyclone while discharging the magnetic oxygen carrier particles (1) through the solid discharge pipe of the oxidizer cyclone.

The magnetic oxygen carrier particles (1) are supplied to a reducer (50). The Reducer (50) comprises a fluidization-gas supplying device (52) to supply fluidization gases such as $CO_2$ and/or steam, a solid-fuel supply pipe (51) to supply solid fuel, a discharge pipe (54), a solid-mixture discharge pipe (53) and a recirculation pipe (55), connected to the oxidizer (30), wherein the reducer brings about gasification of solid fuel by reduction fluidization gases and combustion by the magnetic oxygen carrier particles (1), separated and supplied by the oxidizer cyclone (40), and the ash (2) and reduced magnetic oxygen carrier particles (1) are discharged.

Also, the reducer cyclone (60) separates the gases from the mixture of ash (2) and the oxygen carrier particles (1), discharged from a reducer discharge pipe (54), and discharges the gases through a gas discharge pipe (61) and returns the oxygen carrier particles (1) to a reducer (50) through a solid discharge pipe (62).

And a CLC (100) according to an embodiment of the present invention is configured to comprise a solid cooler (70). Since a CLC (100) operates, in general, at high temperatures of 600 to 1200° C., it is difficult to apply the CLC to said loop seal separator. Accordingly, the process of lowering the temperatures of solid mixture (oxygen carrier particles (1)+ash (2)) is needed. In an embodiment of the preset invention, a solid cooler (70) is equipped between a reducer (50) and a loop seal separator (10) to cool the magnetic oxygen carrier particles (1) and ash (2), discharged from the solid discharge pipe (53) of the reducer (50), and to encourage the magnetic oxygen carrier particles (1) and ash (2) to flow into the duct (11) of the loop seal separator (10).

According to a detailed embodiment of the present invention, the solid cooler (70) takes the form of a fluidized bed reactor and comprises a cooling-gas supply pipe (71) equipped at the lower portion of the solid cooler (70) to supply cooling gases for cooling and fluidization, a part into which solid mixture flow connected to the solid-mixture discharge pipe (53), a solid-cooler discharge pipe (72) equipped on one side of the upper part of the solid cooler (70), and a discharge part connected to the duct (11) of the loop seal separator (10).

Also, the solid-cooler cyclone (80) separates the gases from the mixture of ash (2) and the oxygen carrier particles (1), discharged from the upper portion of the discharge pipe (72) of the solid cooler (70), and discharges gases through a gas discharge pipe (81) and returns the oxygen carrier particles (1) to the solid cooler (70) though a solid discharge pipe (82).

Additionally, the cooled ash (2) and magnetic oxygen carrier particles (1) flow into said loop seal separator (10), and the ash (2) is separated and discharged through the ash discharge pipe, and the magnetic oxygen carrier particles (1) are re-circulated to the oxidizer (30) through the oxygen-carrier-particle discharge pipe (15).

In the following descriptions, the method of operating said SF-CLC (100) will be explained. First, in the oxidizer (30), the magnetic oxygen carrier particles (1) capture oxygen while being fluidized (Step 1).

And an oxidizer cyclone (40) separates the gases from the magnetic oxygen carrier particles (1), discharged from the oxidizer (30), and then encourages the magnetic oxygen carrier particles (1) to flow into a reducer (50) (Step 2).

Also, in the reducer (50), by reduction fluidization gases, gasification of solid fuel takes place and, by the magnetic oxygen carrier particles, separated and supplied by an oxidizer cyclone (40), combustion takes place (Step 3).

Additionally, the ash (2) and magnetic oxygen carrier particles (1) are discharged through the solid-mixture discharge pipe (53) of the reducer (50), flow into the solid cooler (70) (Step 4) and are cooled in the solid cooler (70) (Step 5).

Further, the ash (2) and magnetic oxygen carrier particles (1), discharged from the solid cooler (70), flow into the downward pipe (12) of the duct (11) of the loop seal separator and, by gravity, flow down (Step 6). And then, the ash (2) and magnetic oxygen carrier particles (1) are fluidized and flow up towards the upper portion of the upward pipe (13) bent and connected at the end of the lower portion of the downward pipe (12) (Step 7).

Moreover, the ash (2) and magnetic oxygen carrier particles (1) are separated by the magnetic material (21) of the magnetic separator (20) equipped at the end of the upper portion of the upward pipe (13) (Step 8), the ash (2) is discharged through the ash discharge pipe (14), and the magnetic oxygen carrier particles (1), separated by the magnetic separator (20), flow into the oxidizer (30) and recirculate.

Accordingly, an SF-CLC (100) can operate in a stable way, while preventing the accumulation of ash (2) and reducing the loss of oxygen carrier particles (1), by using the magnetic oxygen carrier particles (1), loop seal separator (10) and solid cooler (70).

Also, the above described device and method does not indicate that the composition and method of the above described embodiments are limitedly applied and each of the embodiments, in whole or in part, can be selectively coordinated to make various changes in its form.

PARTS LIST

1: Magnetic oxygen carrier particle
2: Ash
10: Loop seal separator
11: Duct
12: Downward pipe
13: Upward pipe
14: Ash discharge pipe
15: Oxygen-carrier-particle discharge pipe
20: Magnetic separator
21: Magnetic material
22: Conveyor belt
23: Driving device for the conveyor belt
24: Detaching device
30: Oxidizer
31: Fluidization gas supply pipe
32: Oxidizer discharge pipe
40: Oxidizer cyclone
41: Gas discharge pipe of the oxidizer cyclone
42: Solid discharge pipe of the oxidizer cyclone 50: Reducer
51: Solid-fuel supply pipe
52: Fluidization gas supplying device
53: Solid-mixture discharge pipe
54: Reducer discharge pipe
55: Recirculation pipe
60: Reducer cyclone
61: Gas discharge pipe of the reducer cyclone
62: Solid discharge pipe of the reducer cyclone
70: Solid cooler
71: Cooling-gas supply pipe
72: Solid-cooler discharge pipe
80: Solid-cooler cyclone
81: Gas-discharge pipe of the solid cooler cyclone
82: Solid-discharge pipe of the solid cooler cyclone
100: SF-CLC

The invention claimed is:

1. A loop seal separator using magnetic oxygen carrier particles and a magnetic separator,
the loop seal separator comprising:
a duct into which ash and magnetic oxygen carrier particles, discharged from a reducer, flow;
a magnetic separator to separate the ash from the magnetic oxygen carrier particles, flowing into the duct, by magnetic material;
an ash discharge pipe to discharge the ash separated by the magnetic separator; and
an oxygen-carrier-particle discharge pipe to encourage the magnetic oxygen carrier particles, separated by the magnetic separator, to flow into an oxidizer;
the duct comprising a downward pipe wherein the length direction of the downward pipe is the vertical direction and the ash and magnetic oxygen carrier particles, flowing into the duct, flow down towards the lower portion of the downward pipe by gravity; and
an upward pipe wherein the length direction of the upward pipe is the vertical direction and the upward pipe is bent and connected at the end of the lower portion of the downward pipe to encourage the ash and magnetic oxygen carrier particles to flow up towards the upper part of the upward pipe.

2. The loop seal separator using magnetic oxygen carrier particles and a magnetic separator according to claim 1,
wherein a fluidization-gas supplying device is equipped, at the part where the downward pipe and upward pipe are connected, to inject fluidization gases for cooling and fluidization.

3. The loop seal separator using magnetic oxygen carrier particles and a magnetic separator according to claim 1,
wherein the magnetic oxygen carrier particles are slag balls where slag is manufactured in the form of a sphere by automization.

4. The loop seal separator using magnetic oxygen carrier particles and a magnetic separator according to claim 3,
wherein the slag balls are magnetic in both oxidized and reduced states and are copper slag balls containing $Fe_2O_3$.

5. The loop seal separator using magnetic oxygen carrier particles and a magnetic separator according to claim 1,
wherein the magnetic separator is connected to the end of the upper portion of the upward pipe, and
wherein the magnetic separator comprises magnetic material in the form of a panel;
a conveyor belt contacted by the magnetic oxygen carrier particles by magnetic forces of the magnetic material;
a conveyor driving device to drive the conveyor belt; and
a detaching device to remove the magnetic oxygen carrier particles contacting the conveyor belt and to encourage the magnetic oxygen carrier particles to flow into the oxygen-carrier-particle discharge pipe.

6. A method of separating ash,
the method comprising the steps of encouraging the ash and magnetic oxygen carrier particles, discharged from a reducer, to flow into the downward pipe of a duct and flow down by gravity;
encouraging the ash and magnetic oxygen carrier particles to flow into an upward pipe bent and connected at the end of the lower portion of the downward pipe and to flow up towards the upper portion of the upward pipe;
separating the ash from the magnetic oxygen carrier particles by magnetic material of a magnetic separator equipped at the end of the upper portion of the upward pipe; and
discharging the ash, discharged from the magnetic separator through an ash discharge pipe and encouraging the magnetic oxygen carrier particles, separated by the magnetic separator, to flow into an oxidizer;
the method of separating each other, wherein the ash does not contact a conveyor belt in the upward pipe and is discharged through the ash discharge pipe, while the magnetic oxygen carrier particles contact the conveyor belt by magnetic forces of magnetic material, flow up towards the upper portion of an oxygen-carrier-particle discharge pipe and are removed by a detaching device and then discharged through an oxygen-carrier-particle discharge pipe.

7. An SF-CLC comprising:
an oxidizer to capture oxygen while magnetic oxygen carrier particles are fluidized;
an oxidizer cyclone to separate the gases from the magnetic oxygen carrier particles, discharged from the oxidizer;
a reducer to bring about gasification of solid fuel by reduction fluidization gases and combustion by the magnetic oxygen carrier particles, separated and supplied by the oxidizer cyclone, and to discharge the ash and reduced magnetic oxygen carrier particles;
a loop seal separator according to claim 1 to separate the magnetic oxygen carrier particles from the ash, supplied by the oxidizer, and to encourage only the magnetic oxygen carrier particles to flow into the oxidizer; and
a solid cooler, equipped between the reducer and loop seal separator, to cool the magnetic oxygen carrier particles and ash, discharged from the solid-mixture discharge pipe of the reducer, and then to encourage the magnetic oxygen carrier particles and ash to flow into the duct of the loop seal separator.

8. The SF-CLC according to claim 7,
wherein the solid cooler takes the form of a fluid bed and comprises a cooling-gas supply pipe equipped at the lower portion of the solid cooler to supply cooling gases for cooling and fluidization, a part into which solid-mixture flows connected to the solid-mixture discharge pipe, a solid-cooler discharge pipe equipped on one side of the upper portion of the solid cooler and a discharge part connected to the duct of the loop seal separator.

9. The SF-CLC according to claim 8, further comprising:
a reducer cyclone to separate the gases from the mixture of ash and oxygen carrier particles, discharged from the reducer, and to return the oxygen carrier particles to the reducer.

10. The SF-CLC according to claim 9, further comprising:
a solid-cooler cyclone to separate the gases from the mixture of ash and oxygen carrier particles, discharged from the solid cooler, and to return the mixture of ash and oxygen carrier particles to the solid cooler.

11. A method of operating the SF-CLC,
the method comprising the steps of capturing oxygen while magnetic oxygen carrier particles are fluidized in an oxidizer;
separating the gases from the magnetic oxygen carrier particles, discharged from the oxidizer, in an oxidizer cyclone;
bringing about gasification of solid fuel by reduction fluidization gases and combustion by the magnetic oxygen carrier particles, separated and supplied by the oxidizer cyclone, in a reducer;
discharging the ash and magnetic oxygen carrier particles through the solid-mixture discharge pipe of the reducer and encouraging the ash and magnetic oxygen carrier particles to flow into a solid cooler;
cooling the ash and magnetic oxygen carrier particles in the solid cooler; and
encouraging the magnetic oxygen carrier particles and ash, cooled in the solid cooler, to flow into a loop seal separator, separating the magnetic oxygen carrier particles from the ash by magnetic material, discharging the ash through an ash discharge pipe and recirculating the magnetic oxygen carrier particles along with gases through an oxygen-carrier-particle discharge pipe; and
the method of circulation comprising the steps of encouraging the ash and magnetic oxygen carrier particles, discharged from a solid cooler, to flow into the downward pipe of a duct and to flow down by gravity;
encouraging the ash and magnetic oxygen carrier particles to flow into an upward pipe bent and connected at the end of the lower portion of the downward pip, and to flow up towards the upper portion of the upward pipe;
separating the ash from the magnetic oxygen carrier particles by magnetic material of a magnetic separator equipped at the end of the upper portion of the upward pipe; and
discharging the ash, separated by the magnetic separator, through an ash discharge pipe and encouraging the magnetic oxygen carrier particles, separated by the magnetic separator, to flow into an oxidizer.

* * * * *